United States Patent
Huang et al.

(10) Patent No.: US 11,709,999 B2
(45) Date of Patent: Jul. 25, 2023

(54) METHOD AND APPARATUS FOR ACQUIRING POI STATE INFORMATION, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Jizhou Huang, Beijing (CN); Yibo Sun, Beijing (CN); Ying Li, Beijing (CN); Ming Liu, Beijing (CN); Bing Qin, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/252,689

(22) PCT Filed: May 13, 2020

(86) PCT No.: PCT/CN2020/090099
§ 371 (c)(1),
(2) Date: Dec. 15, 2020

(87) PCT Pub. No.: WO2021/082397
PCT Pub. Date: May 6, 2021

(65) Prior Publication Data
US 2022/0253612 A1    Aug. 11, 2022

(30) Foreign Application Priority Data
Oct. 28, 2019    (CN) .......................... 201911029247.5

(51) Int. Cl.
*G06F 16/00*    (2019.01)
*G06F 40/40*    (2020.01)
(Continued)

(52) U.S. Cl.
CPC .............. *G06F 40/40* (2020.01); *G06F 16/29* (2019.01); *G06F 16/35* (2019.01); *G06F 16/9537* (2019.01); *G06F 40/30* (2020.01)

(58) Field of Classification Search
CPC .......... G06F 40/40; G06F 16/29; G06F 16/35; G06F 16/9537; G06F 40/30;
(Continued)

(56) References Cited

U.S. PATENT DOCUMENTS 9,916,362 B2*   3/2018   Parundekar ........ G06Q 30/0631
10,592,914 B2*  3/2020   Milton ............... G06Q 30/0205
(Continued)

FOREIGN PATENT DOCUMENTS

CN    105095390 A    11/2015
CN    109145219 A    1/2019
(Continued)

OTHER PUBLICATIONS

Lagos et al., Point-Of-Interest Semantic Tag Completion in a Global Crowdsourced Search-and-Discovery Database, 9 pages (Year: 2020).*
(Continued)

*Primary Examiner* — Noosha Arjomandi
(74) *Attorney, Agent, or Firm* — Seed IP Law Group LLP

(57) ABSTRACT

The present application discloses a method and apparatus for acquiring point-of-interest (POI) state information, a device and a computer storage medium, and relates to the field of big data. An implementation includes acquiring a text containing POI information in a preset time period from the Internet; and identifying the text using a pre-trained POI-state identifying model to obtain a binary group in the text, the binary group including a POI name and the POI state information corresponding to the POI name; wherein the POI-state identifying model performs label prediction of the POI name and a POI state on a word sequence corresponding
(Continued)

to the text, and label prediction results of the POI name and the POI state are aligned to obtain the binary group. With the present application, a human cost may be saved, and timeliness and accuracy may be improved.

16 Claims, 8 Drawing Sheets

(51) Int. Cl.
*G06F 16/35* (2019.01)
*G06F 16/9537* (2019.01)
*G06F 16/29* (2019.01)
*G06F 40/30* (2020.01)

(58) Field of Classification Search
CPC ... G06F 16/337; G06F 16/3344; G06N 3/048; G06N 7/01; G06N 3/044; G06N 3/045; G06N 3/047; G06N 3/084; G06N 3/08
See application file for complete search history.

(56) References Cited

U.S. PATENT DOCUMENTS

| | | | | |
|---|---|---|---|---|
| 11,347,782 | B2* | 5/2022 | Huang | G01C 21/3811 |
| 11,481,666 | B2* | 10/2022 | Zhang | G06F 16/2465 |
| 11,556,601 | B2* | 1/2023 | Fan | G06F 16/24578 |
| 2007/0078669 | A1* | 4/2007 | Dave | G06Q 30/0282 705/347 |
| 2011/0059759 | A1* | 3/2011 | Ban | H04L 67/52 715/810 |
| 2013/0166480 | A1 | 6/2013 | Popescu et al. | |
| 2014/0006408 | A1 | 1/2014 | Rae et al. | |
| 2015/0142789 | A1* | 5/2015 | Parundekar | G06F 16/29 707/724 |
| 2017/0061482 | A1* | 3/2017 | Guo | G06Q 30/0255 |
| 2017/0219367 | A1* | 8/2017 | Liu | H04H 60/64 |
| 2018/0014161 | A1 | 1/2018 | Warren et al. | |
| 2018/0040011 | A1* | 2/2018 | Milton | G06Q 30/0205 |
| 2019/0228073 | A1 | 7/2019 | Chatterjee et al. | |
| 2019/0228337 | A1* | 7/2019 | Zhang | H04W 4/029 |
| 2020/0081908 | A1* | 3/2020 | Huang | G06F 16/3344 |
| 2020/0132501 | A1* | 4/2020 | Czarnecki | G01C 21/3682 |
| 2020/0134388 | A1* | 4/2020 | Rohde | G06N 5/022 |
| 2020/0143159 | A1* | 5/2020 | Deguchi | G06N 20/00 |
| 2020/0159755 | A1 | 5/2020 | Iida et al. | |
| 2021/0089531 | A1* | 3/2021 | Hu | G06F 16/90 |
| 2021/0254994 | A1* | 8/2021 | Aït-Mokhtar | G06F 16/3344 |
| 2021/0279749 | A1* | 9/2021 | Breunig | H04W 4/025 |
| 2021/0357468 | A1* | 11/2021 | Fan | H04L 67/535 |
| 2022/0253612 | A1* | 8/2022 | Huang | G06F 16/337 |
| 2022/0397408 | A1* | 12/2022 | Bahnsen | G01C 21/3484 |

FOREIGN PATENT DOCUMENTS

| | | |
|---|---|---|
| CN | 110019616 A | 7/2019 |
| CN | 110276023 A | 9/2019 |
| CN | 110851738 A | 2/2020 |
| JP | 2012-014548 A | 1/2012 |
| JP | 2016-024545 A | 2/2016 |
| JP | 2017-208045 A | 11/2017 |
| JP | 2018-022505 A | 2/2018 |
| JP | 2018-106035 A | 7/2018 |
| JP | 2018-190188 A | 11/2018 |
| JP | 2018-206262 A | 12/2018 |
| JP | 2019-153119 A | 9/2019 |
| JP | 2020-071839 A | 5/2020 |
| KR | 20190103090 A | 9/2019 |

OTHER PUBLICATIONS

Toshio Teraguchi (and 2 others), Study of Automatic Collection of New Store Information Utilizing Web Resources and Geographic Information; Intelligence and Information; Japan; Japan Society of Fuzzy Intelligence and Informatics, Aug. 15, 2011, vol. 23, No. 4, p. 411-427. (Abstract).

* cited by examiner

| | | | | | | | | | | | | | | | | | | | | | | | |
|---|---|---|---|---|---|---|---|---|---|---|---|---|---|---|---|---|---|---|---|---|---|---|---|
| ▯ ▯ ▯ ▯ | ▯ ▯ | ▯ ▯ | ▯ ▯ | ▯ ▯ ▯ ▯ | ▯ ▯ | ▯ ▯ ▯ | ▯ | ▯ | 3▯ | 30▯ | ▯ ▯ | ▯ ▯ ▯ ▯ | ▯ | ▯ | ▯ ▯ | ▯ ▯ | ▯ | ▯ |
| POI▯ ▯ ▯ | O | B | I | O | O O | B | I | I | O O O O | O | O | O O | B | I | I | O |
| POI▯ ▯ ▯ | O | new | new | O | O O | new | new | new | O O O O | O | O | O O | O | O | O | O |

METHOD AND APPARATUS FOR ACQUIRING POI STATE INFORMATION, DEVICE AND COMPUTER STORAGE MEDIUM

The present application claims priority to Chinese Patent Application No. 201911029247.5, entitled "Method and Apparatus for Acquiring POI State Information, Device and Computer Storage Medium", filed on Oct. 28, 2019.

FIELD OF THE DISCLOSURE

The present application relates to the technical field of computers, and particularly to a method and apparatus for acquiring POI state information, a device and a computer storage medium in the field of big data.

BACKGROUND OF THE DISCLOSURE

A point of interest (POI) is a term in a geographic information system, and generally refers to all geographic objects which may be abstracted as points, and one POI may be a house, a shop, a mailbox, a bus station, a school, a hospital, or the like. The POI has a main purpose of describing the position of a thing or an event, thereby enhancing the capacity of describing and querying the position of the thing or event.

In Internet map applications, the POI plays a very important role. A user may conveniently find a place of interest and a route to the place in a map using the POI. However, due to the influence of city planning and other factors, information of some POIs changes over time, such as new POIs, moved POIs, renamed POIs, closed POIs, or the like. If a POI database is unable to be updated in time, the users may not find the information in which they are interested, and even misled when searching using the map. For example, after navigated to a certain mall, the user obviously has a bad experience when finding that the mall is moved or closed.

Currently, POI state information is mainly acquired by manpower, for example, collected by a worker on site, or actively reported by the user. However, these ways waste human resources, have higher costs, and depend on human initiative seriously, and timeliness and accuracy are difficult to guarantee.

SUMMARY OF THE DISCLOSURE

In view of this, the present application provides a method and apparatus for acquiring POI state information, a device and a computer storage medium, so as to save a human cost and improve timeliness and accuracy.

In a first aspect, the present application provides a method for acquiring point-of-interest (POI) state information, including:

acquiring a text containing POI information in a preset time period from the Internet; and identifying the text using a pre-trained POI-state identifying model to obtain a binary group in the text, the binary group including a POI name and the POI state information corresponding to the POI name;

wherein the POI-state identifying model performs label prediction of the POI name and a POI state on a word sequence corresponding to the text, and label prediction results of the POI name and the POI state are aligned to obtain the binary group.

According to a preferred implementation of the present application, the acquiring a text containing POI information in a preset time period from the Internet includes:

acquiring texts in the preset time period from the Internet;

identifying the POI information in the acquired texts by a pre-trained POI identifier; and retaining the text containing the POI information.

According to a preferred implementation of the present application, the POI identifier is trained by:

extracting popular POI information from a POI database;

searching in the Internet using the extracted POI information; and training a label prediction model using the searched text and the corresponding POI information to obtain the POI identifier.

According to a preferred implementation of the present application, the operation that the POI-state identifying model performs label prediction of the POI name and a POI state on a word sequence corresponding to the text includes:

extracting semantic features of the word sequence corresponding to the text using the POI-state identifying model to obtain a hidden-layer vector sequence; and performing the label prediction of the POI name and the POI state on the hidden-layer vector sequence.

According to a preferred implementation of the present application, the operation that label prediction results of the POI name and the POI state are aligned to obtain the binary group includes:

determining a boundary of each predicted POI name label; and determining a corresponding POI state label in the boundary of the POI name label, and determining the POI state corresponding to the POI name using the POI state label occurring in the boundary most frequently based on a voting mechanism.

According to a preferred implementation of the present application, the method further includes:

updating the POI database using the obtained binary group.

In a second aspect, the present application provides a method for building a POI-state identification model, including:

acquiring training data which includes a text and label annotation results for a POI name and a POI state contained in the text; and obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model including the first and second label prediction submodels;

wherein the built POI-state identifying model is configured to identify an input text to obtain a binary group in the text, and the binary group includes a POI name and POI state information corresponding to the POI name.

According to a preferred implementation of the present application, the acquiring training data includes:

acquiring a seed text and the label annotation results of the POI name and the POI state corresponding to the POI name contained in the seed text;

replacing the POI name in the seed text with a POI name in a POI database which has the same type as the POI name contained in the seed text, so as to obtain an extended text; and obtaining the training data by the seed text and the extended text.

According to a preferred implementation of the present application, the acquiring a seed text includes:

acquiring texts containing the POI name from the Internet using a pre-trained POI identifier; and filtering out texts which do not contain POI state change information from the texts containing the POI name utilizing a pre-constructed dictionary, so as to obtain the seed text; wherein the dictionary includes words for expressing the POI state change information.

According to a preferred implementation of the present application, the obtaining input of a first label prediction submodel and a second label prediction submodel using a word sequence corresponding to the text includes:

extracting semantic features of the word sequence corresponding to the text to obtain a hidden-layer vector sequence of the text; and taking the hidden-layer vector sequence as the input of the first and second label prediction submodels.

According to a preferred implementation of the present application, the extracting semantic features of the word sequence corresponding to the text includes:

extracting the semantic features of the word sequence corresponding to the text using an enhanced representation from knowledge integration (ERNIE) model.

According to a preferred implementation of the present application, the training data further includes a label annotation result for an auxiliary POI name in the text, the auxiliary POI name being a POI name without a corresponding POI state description in the text;

the method further includes:

taking the hidden-layer vector sequence of the text as input of a third label prediction submodel, and taking the label annotation result of the auxiliary POI name of the text as an output target of the third label prediction submodel; and training the third label prediction submodel when training the first and second label prediction submodels.

According to a preferred implementation of the present application, a conditional random field (CRF) mechanism is adopted for the first and second label prediction submodels.

In a third aspect, the present application provides an apparatus for acquiring POI state information, including:

a text acquiring unit configured to acquire a text containing POI information in a preset time period from the Internet; and a state identifying unit configured to identify the text using a pre-trained POI-state identifying model to obtain a binary group in the text, the binary group including a POI name and the POI state information corresponding to the POI name; wherein the POI-state identifying model performs label prediction of the POI name and a POI state on a word sequence corresponding to the text, and label prediction results of the POI name and the POI state are aligned to obtain the binary group.

In a fourth aspect, the present application provides an apparatus for building a POI-state identification model, including:

an acquiring unit configured to acquire training data which includes a text and label annotation results for a POI name and a POI state contained in the text; and a training unit configured to obtain input of a first label prediction submodel and a second label prediction submodel using a word sequence corresponding to the text, and train the first and second label prediction submodels with the label annotation result of the POI name contained in the text as an output target of the first label prediction submodel and the label annotation result of the POI state contained in the text as an output target of the second label prediction submodel, so as to obtain the POI-state identifying model including the first and second label prediction submodels;

wherein the built POI-state identifying model is configured to identify an input text to obtain a binary group in the text, and the binary group includes a POI name and POI state information corresponding to the POI name.

In a fifth aspect, the present application provides an electronic device, including:

at least one processor; and a memory connected with the at least one processor communicatively;

wherein the memory stores instructions executable by the at least one processor to cause the at least one processor to perform the method as mentioned above.

In a sixth aspect, the present application provides a non-transitory computer readable storage medium with computer instructions stored thereon, wherein the computer instructions are used for causing a computer to perform the methods as mentioned above.

According to the above technical solution of the present application, by mining the POI name and the POI state information corresponding to the POI name from the Internet text containing the POI information, a timely response of the Internet to a POI state change event is fully utilized, and compared with the way of manually determining the POI information with the changed state, the human cost is saved, and the timeliness and the accuracy are improved.

According to the present application, both inclusion of the POI state change information in the Internet text and the specific POI state information of the changed POI name may be identified.

In the present application, the POI-state identifying model does not adopt the traditional subtask pipeline operation form that the POI name is identified from the text first, and then, the POI state information of the POI name is identified. Instead, the mode of parallel and associated processing of a plurality of subtasks is adopted; that is, the POI name and the POI state of the text are predicted in parallel, and then, the two prediction results are aligned to obtain the binary group.

In the present application, in the case where the text contains a plurality of POI names at the same time but only one POI name has the state change, the prediction submodel for the auxiliary POI name is merged into the POI-state identifying model and trained concurrently, thereby accurately identifying the POI name with the state change in the text, and eliminating the interference of the auxiliary POI name.

In the present application, when the POI-state identifying model is trained, data extension is performed on the seed text using the POI database to obtain the training data, thereby increasing the number of the training texts to improve the accuracy of the POI-state identifying model.

In the POI-state identifying model in the present application, the semantic features of the word sequence corresponding to the input text are extracted using the ERNIE model, thereby efficiently solving the problem of long tail words in the POI name.

In the present application, the POI database is updated by the mined binary group, such that subsequent services provided based on the POI database are more accurate, thereby improving user experiences.

Other effects of the above-mentioned alternatives will be described below in conjunction with embodiments.

DETAILED DESCRIPTION OF PREFERRED EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

Figure 1:
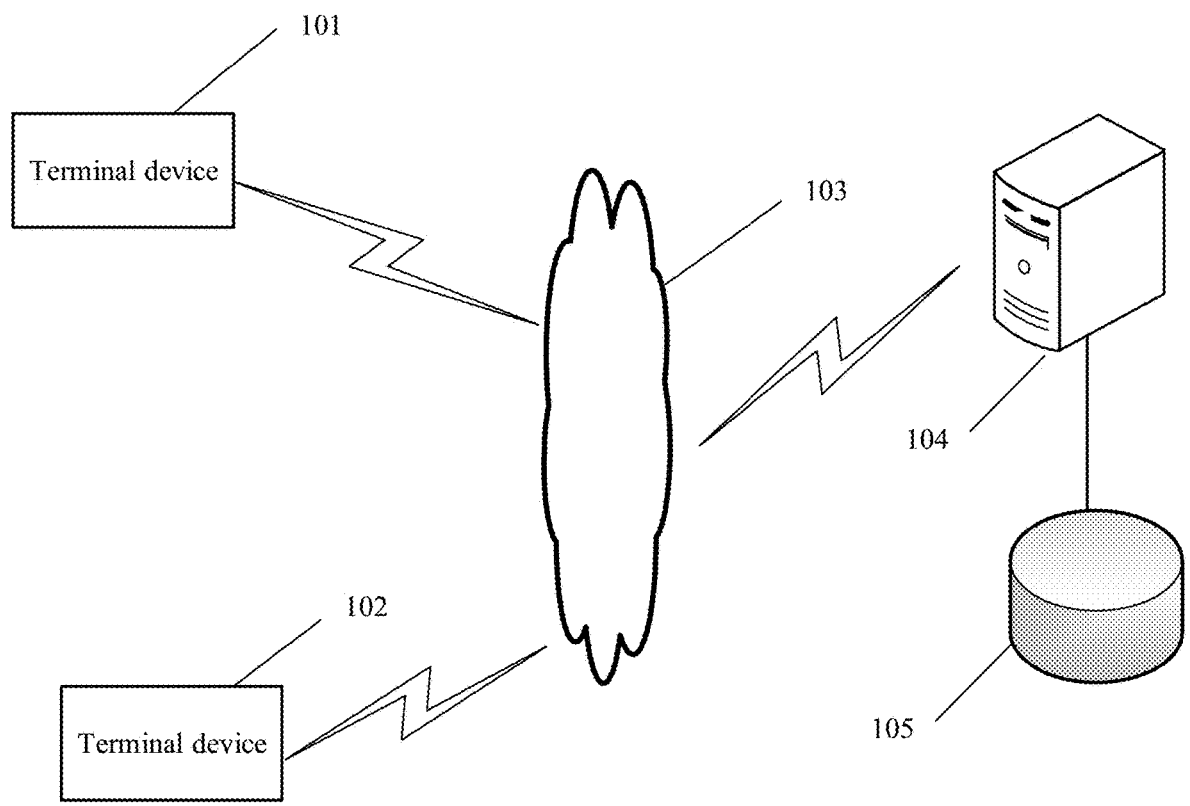
FIG. 1 shows an exemplary system architecture to which a method or apparatus according to embodiments of the present application may be applied.

FIG. 1 shows an exemplary system architecture to which a method or apparatus according to embodiments of the present application may be applied. As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a map application, a web browser application, a communication application, or the like, may be installed on the terminal devices 101, 102.

The terminal devices 101, 102 may be configured as various user devices in which the map applications may be run, including, but not limited to, smart phones, tablets, PCs, smart televisions, or the like. An apparatus for acquiring point-of-interest (POI) state information and an apparatus for building a POI-state identifying model according to the present application may be provided and run in the above-mentioned server 104 or a device independent of the server 104. The apparatus may be implemented as a plurality of pieces of software or a plurality of software modules (for example, for providing distributed service), or a single piece of software or a single software module, which is not specifically limited herein. The server 104 may interact with a POI database 105, and specifically, the server 104 may acquire data from the POI database 105 or store data in the POI database 105. The POI database 105 stores map data including POI information.

For example, the apparatus for acquiring the POI state information is provided and run in the above-mentioned server 104, and the server 104 acquires the POI state information using the method according to the embodiment of the present application, and then updates the POI database 105 with the acquired POI state information. The server 104 is able to query the POI database 105 in response to a query request of the terminal devices 101, 102 and return the queried POI information to the terminal devices 101, 102.

The server 104 may be configured as a single server or a server group including a plurality of servers. In addition, the server 104 may be configured as other computer systems or processors with higher computing performance, besides existing in the form of a server. It should be understood that the numbers of the terminal devices, the network, the server and the database in FIG. 1 are merely schematic. There may be any number of terminal devices, networks, servers and databases as desired for an implementation.

In the present application, based on the richness and the real-time performance of Internet big data, the POI state information is mined from an Internet text with the Internet big data as a data source. A core idea includes acquiring a text containing POI information in a preset time period from the Internet; and identifying the text using a pre-trained POI-state identifying model to obtain a binary group in the text, the binary group including a POI name and the POI state information corresponding to the POI name. The overall solution of the present application involves establishment of a POI-state identifying model and acquisition of the POI state information by the POI-state identifying model. The two parts are described in detail below with reference to embodiments respectively.

First Embodiment

Figure 2:
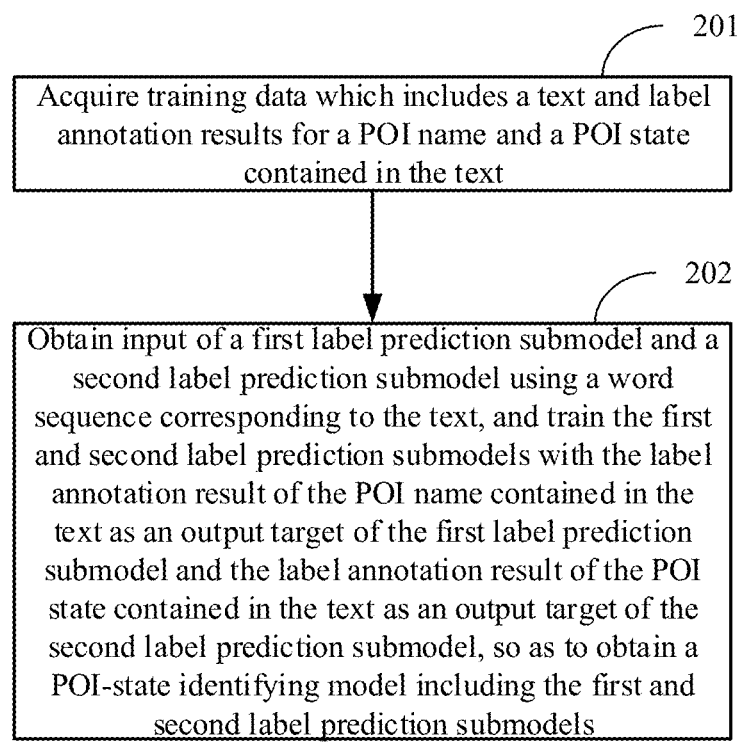
FIG. 2 is a flow chart of a method for building a POI-state identifying model according to an embodiment of the present application.

FIG. 2 is a flow chart of a method for building a POI-state identifying model according to an embodiment of the present application, and as shown in FIG. 2, the method may include the following steps:

in 201, acquiring training data which includes a text and label annotation results for a POI name and a POI state contained in the text.

Figure 3:
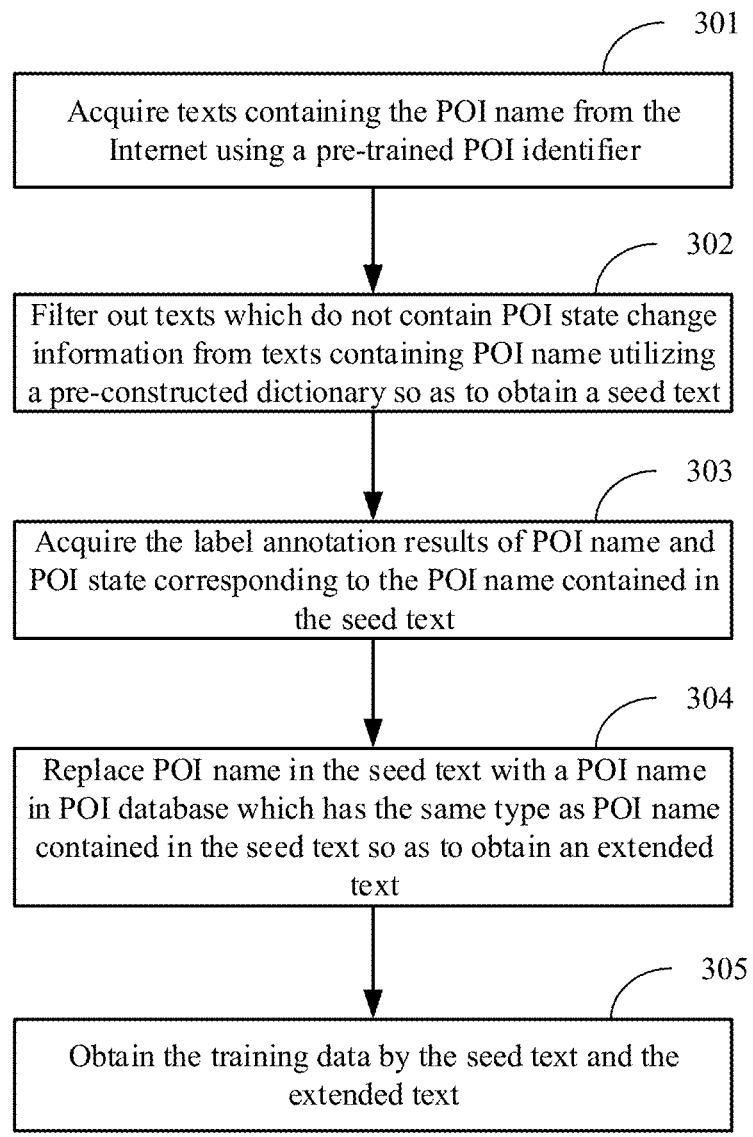
FIG. 3 is a flow chart of a method for acquiring training data according to an embodiment of the present application.

When the training data is acquired, some texts containing the POI name and the POI state may be manually annotated to serve as the training data. However, this way may only generate a small amount of data due to manpower limitation, and certain restrictions are imposed on model training accuracy. Here, as a preferred implementation, the training data may be acquired with the method as shown in FIG. 3, and the method includes:

in 301, acquiring texts containing the POI name from the Internet using a pre-trained POI identifier.

Internet texts are crawled from web pages, and in order to ensure that the text contains the POI information, the POI identifier may be trained, and the text which is identified by the POI identifier to contain the POI information is retained.

The process of pre-training the POI identifier includes: extracting popular POI information from a POI database, wherein the popular POI information may have retrieval popularity exceeding a certain degree, and for example, have a retrieval frequency in a set duration exceeding a preset frequency threshold; and then, searching in the Internet using the extracted POI information, and training a label prediction model using the searched text and the corresponding POI information, so as to obtain the POI identifier. The POI identifier may output the POI information contained in the text after the text is input. The POI information may include the POI name. It should be noted that In the present application, the POI name refers to information for indicating and distinguishing one POI, and for example, a character string or logo, such as "McDonald's", "MC", or the like, may be used as the POI name.

The label prediction model used in the process of training the POI identifier may have a structure including a bidirectional long short-term memory (LSTM) and a conditional random field (CRF). Certainly, other types of structures may be used and are not specifically enumerated and described herein.

In 302, filtering out texts which do not contain POI state change information from the texts containing the POI name utilizing a pre-constructed dictionary, so as to obtain a seed text.

The dictionary includes words containing the POI state change information. In order to ensure that the text contains the information for describing a POI state change, the dictionary is pre-constructed, and semantics of the words in the dictionary is associated with the POI state change. The POI state change may include "new", "moved", "renamed", "closed", or the like.

After the processing operations in the above-mentioned 301 and 302, the obtained seed text includes the POI name and the POI state change information. The above-mentioned 301 and 302 are a preferred implementation for acquiring the seed text, and besides the above-mentioned way, the seed text may also be obtained simply by manually constructing the text.

In 303, acquiring the label annotation results of the POI name and the POI state corresponding to the POI name contained in the seed text.

The number of the seed texts acquired in this step is small, and a manual annotation way may be adopted. However, if the small number of seed texts are used as the training data to train the POI-state identifying model, the accuracy of the POI-state identifying model may not be high enough. In order to further improve the training effect, on this basis, the seed text may be subjected to data enhancement using the POI database. That is, in 304, replacing the POI name in the seed text with a POI name in the POI database which has the same type as the POI name contained in the seed text, so as to obtain an extended text.

Specifically, the POI names contained in the seed text and the POI names in the POI database may be classified by a classification model respectively. The classified categories are used for distinguishing characteristics of POIs, such as a restaurant category, a company category, a house category, or the like.

For example, if one seed text is "company A has been moved, and business is suspended during the movement", and the POI name "company A" contained in the seed text belongs to the company category, the POI names "company B", "company C", or the like, of the same type may be found from the POI database, and after company "A" in the seed text is replaced with these names respectively, the following extended texts are obtained: "company B has been moved, and business is suspended during the movement", "company c has been moved, and business is suspended during the movement", or the like.

The classification model may be pre-trained using a large number of (POI name, type label) pairs in the POI database, and for example, may have a structure including the bidirectional LSTM and softmax.

In 305, obtaining the training data by the seed text and the extended text.

After the seed text is extended, a large number of extended texts may be obtained, and then, the seed text and the extended texts jointly form the training data. The training data contains the text and the label annotation results of the POI name and the POI state corresponding to the POI name contained in the text.

With continued reference to FIG. 2, after the training data is obtained through the flow shown in FIG. 3, in 202, obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model including the first and second label prediction submodels.

The POI-state identifying model trained in the present application is a joint model and at least includes the first and second label prediction submodels, the first label prediction submodel is configured to predict the POI name contained in the text, and the second label prediction submodel is configured to predict the POI state change information contained in the text. The both submodels work in parallel. However, in practical situations, a plurality of POI names may be contained in one text, but only one POI name has the state change, and therefore, the other POI names interfere with the identification, and are called "auxiliary POIs", i.e., POI names without corresponding POI state descriptions in the text. In order to solve the interference problem, the embodiment of the present application provides a preferred implementation that the joint model further contains a third label prediction submodel for identifying an auxiliary POI name, and the training data further includes a label annotation result for the auxiliary POI in the text. The training process of the POI-state identifying model is described herein with this preferred implementation as an example.

Figure 4:
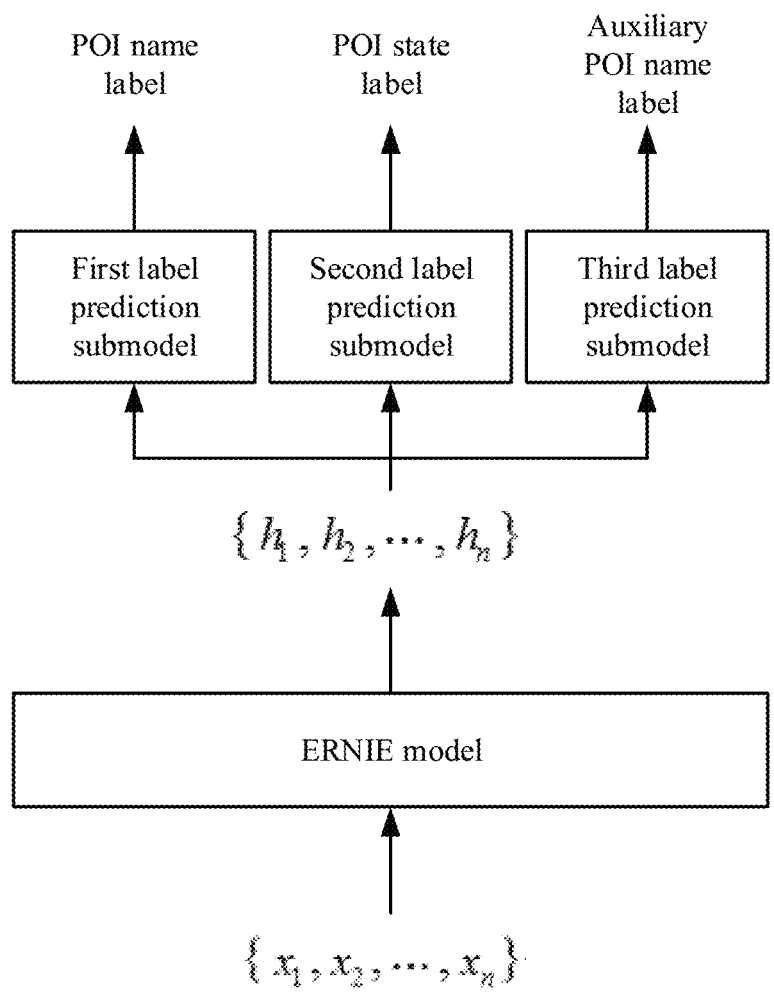
FIG. 4 is a schematic diagram of the POI-state identifying model according to an embodiment of the present application.

The word sequence corresponding to the text in the training data serves as the overall input of the whole POI-state identifying model. As shown in FIG. 4, in the POI-state identifying model, semantic features of the word sequence corresponding to the text are first extracted to obtain a hidden-layer vector sequence of the text. The semantic features of the word sequence may be extracted using a traditional word2vec model, a glove model, or the like, but usually, a long tail word is used in the POI name, and the traditional model is unable to well express the semantics of the word sequence. Therefore, in a preferred implementation of the present application, the semantic features of the word sequence corresponding to the text are extracted by an enhanced representation from knowledge semantic representation (ERNIE) model. A subword policy is used in the ERNIE model; that is, the POI name is separated into words with finer granularity using a byte-pair encoding (BPE) algorithm, thereby efficiently solving the problem of the long tail word.

It is assumed that the word sequence corresponding to a certain text X in the training data is denoted as $\{x_1, x_2, \ldots, x_n\}$, wherein n is the number of words in X. $\{x_1, x_2, \ldots, x_n\}$ serves as the input of the ERNIE model, and the hidden-layer vector sequence $\{h_1, h_2, \ldots, h_n\}$ is output after the semantic features are extracted by the ERNIE model.

As shown in FIG. 4, the hidden-layer vector sequence $\{h_1, h_2, \ldots, h_n\}$ serves as the input of the first, second and third label prediction submodels respectively.

The label annotation result of the POI name contained in the text serves as an output target of the first label prediction submodel. The label annotation result of the POI state change information contained in the text serves as an output target of the second label prediction submodel. The label annotation result of the auxiliary POI in the text serves as an output target of the third label prediction submodel. The three submodels are jointly trained as a whole, and parameters of each model are continuously updated in the iterative training process.

The above-mentioned first, second and third label prediction submodels have working principles which are basically the same. After the shared hidden-layer vector sequence $\{h_1, h_2, \ldots, h_n\}$ is obtained, label prediction may be performed using the CRF, and each submodel has the following basic principle:

if a predicted sequence output by the submodel is $Y=\{y^1, y_2, \ldots, y_n\}$, a score for this sequence may be obtained:

$$s(X, Y) = \sum_{i=1}^{n} p_i^{y_i} + \sum_{i=0}^{n} T_{y_i, y_{i+1}}$$

wherein $p_i^{y_i} = (W_{y_i}^T h_i)$, $W_{y_i}$ is a weight parameter which is one of the model parameters. $W_{y_i} \in \Re^{\{2d \times c\}}$, wherein $\Re$ represents a real number field, d is the dimension of $h_i$, and c is the number of labels output by the model. $T_{y_i, y_{i+1}}$ represents a transition probability matrix from $y_i$ to $y_{i+1}$.

Finally, the probability of each predicted sequence Y may be obtained using a softmax layer:

$$p(Y|X) = \frac{e^{s(X,Y)}}{\sum_{\tilde{Y} \in Y_x} e^{s(X,\tilde{Y})}}$$

wherein $Y_x$ is a set of all the predicted sequences.
A loss function adopted in the training phase is:

$$L_\theta = \sum_i \log(p(Y|X)).$$

If the loss functions of the first, second and third label prediction submodels are denoted as $L_p$, $L_c$ and $L_a$ respectively, have the same form, but each contain different model parameters, in the training process, all the model parameters may be trained through backpropagation through time (BPTT) using the derivative of a joint loss function $\Im(\Theta)$.

The following formula may be adopted for $\Im(\Theta)$:

$$\Im(\Theta) = L_p + L_c + L_a + \frac{\lambda}{2} \|\Theta\|$$

wherein $\Theta$ represents a set of all the model parameters, and $\lambda$ is a regularized parameter.

Besides the above-mentioned CRF mechanism, other mechanisms, such as softmax, or the like, may be used for each label prediction submodel, and are not listed here.

The final POI-state identifying model is obtained after the training process by the above-mentioned joint loss function. The POI-state identifying model may identify the input text to obtain a binary group in the text, and the binary group includes the POI name and the POI state information corresponding to the POI name, and is represented as (POI name, state information).

Second Embodiment

Figures 5, 6:
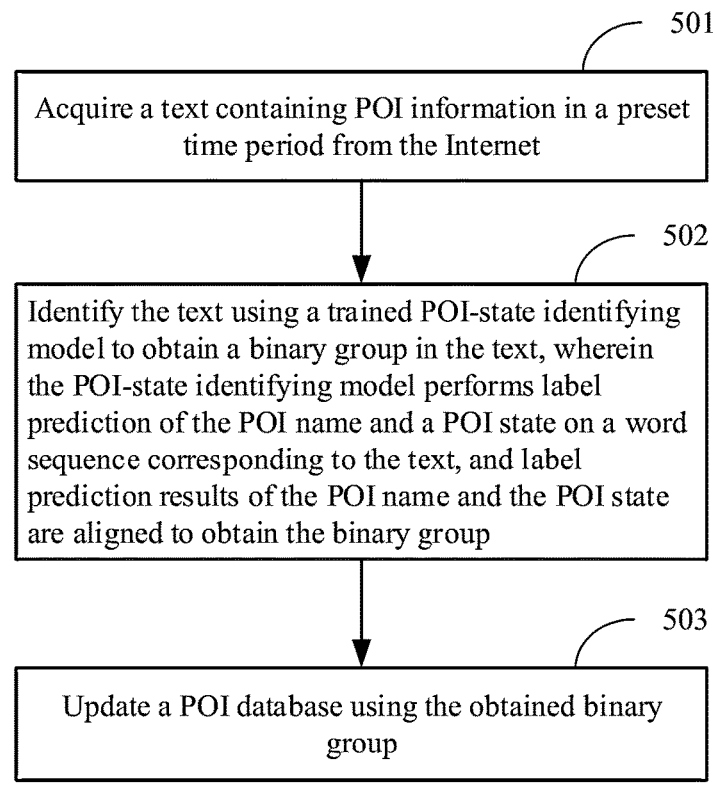
FIG. 5 is a flow chart of a method for acquiring POI state information according to an embodiment of the present application.
FIG. 6 is a diagram of an instance of performing label prediction on a text according to an embodiment of the present application.

FIG. 5 is a flow chart of a method for acquiring POI state information according to an embodiment of the present application, and the method is based on the POI-state identifying model built with the flow shown in FIG. 2. As shown in FIG. 5, the method may include the following steps:

in 501, acquiring a text containing POI information in a preset time period from the Internet.

In order to guarantee the real-time performance of the POI state information, texts in a recent period of time may be crawled from the Internet, and then, the POI information in the acquired texts is identified by a pre-trained POI identifier, and the text containing the POI information is retained.

For the description of the POI identifier, reference may be made to the relevant description in the step 301 in the first embodiment, and the description is not repeated herein.

In 502, identifying the text using a trained POI-state identifying model to obtain a binary group in the text, i.e., (POI name, state information).

The POI-state identifying model performs label prediction of the POI name and a POI state on a word sequence corresponding to the text, and label prediction results of the POI name and the POI state are aligned to obtain the binary group.

Semantic features of the word sequence corresponding to the input text are first extracted by the POI-state identifying model, for example, the ERNIE model in FIG. 4, so as to obtain a hidden-layer vector sequence; and then, the label prediction of the POI name is performed on the obtained hidden-layer vector sequence by a first label prediction submodel, and the label prediction of the POI state is performed on the hidden-layer vector sequence by a second label prediction submodel.

The above-mentioned alignment process may include: determining a boundary of each POI name label predicted for the word sequence corresponding to the text; and determining a corresponding POI state label in the boundary of the POI name label, and determining the POI state corresponding to the POI name using the POI state label occurring in the boundary most frequently based on a voting mechanism.

For example:

it is assumed that the input text is "after the Pingshan library is opened, the Pingshan art museum is also officially opened on March 30".

After prediction by the POI-state identifying model, labels are shown in FIG. 6. "O" indicates that there is no relevant label or a label which identifies the POI name and the POI state. "B" represents a start label of the POI name, and "I" represents an intermediate label of the POI name; that is, "B" indicates a start boundary of the POI name labels, and the last one of continuous I indicates an end boundary of the POI name. "New" represents a "new" state label in the POI state information.

It may be seen that two "new" labels are located within the boundary of the POI name labels corresponding to the "Pingshan library", a voting result generated by the two "new" labels is "new", and therefore, a binary group (Pingshan library, new) may be determined. The other three "new" labels are located within the boundary of the POI name labels corresponding to the "Pingshan art museum", a voting result generated by the three "new" labels is "new", and therefore, a binary group (Pingshan art museum, new) may be determined. In the identification process of the POI-state identifying model, although the "Pingshan center park" is also a POI name, since it is an auxiliary POI, it is not tagged with a POI state label.

It should be noted that in the above-mentioned example, label prediction is performed with words as granularity, and label prediction may also be performed with characters as granularity.

In 503, updating a POI database using the obtained binary group.

After a series of binary groups are mined for the Internet text, the mined binary groups may be compared with the POI names and the POI state information corresponding to the POI names recorded in the POI database, and if inconsistency exists, the POI names and the POI state information corresponding to the POI names recorded in the POI database may be updated with the mined binary groups.

In the updating process, the accuracy of the binary group may be measured according to the occurrence frequency of the mined binary group; for example, the binary group with the occurrence frequency greater than a preset frequency threshold is considered to be accurate, and the POI database may be updated with the accurate binary group.

The methods according to the present application are described above in detail, and apparatuses according to the present application will be described below in detail in conjunction with embodiments.

Third Embodiment

Figure 7:
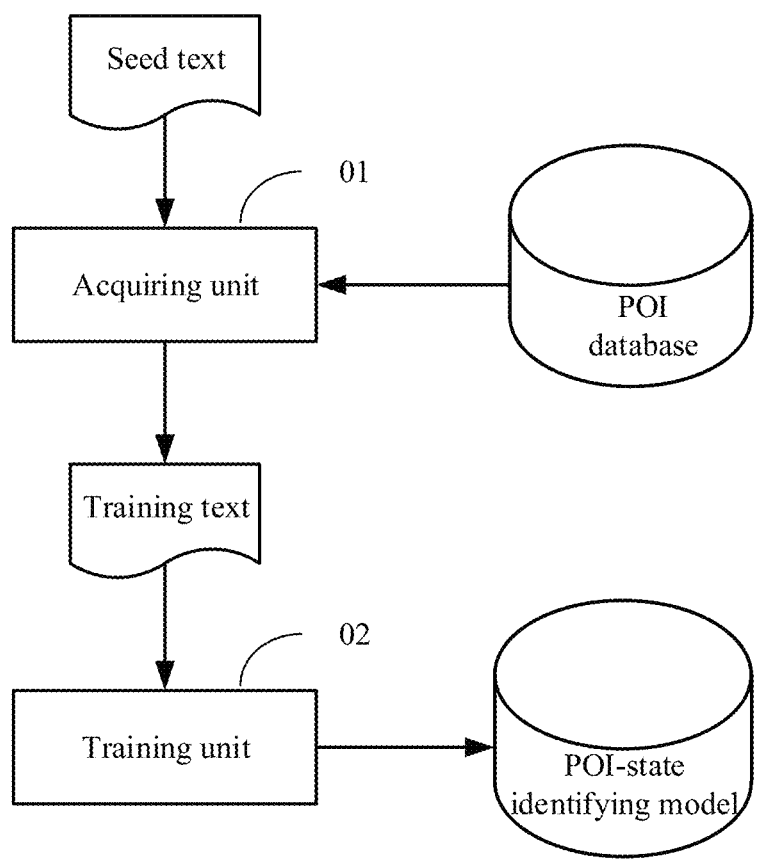
FIG. 7 is a structural diagram of an apparatus for building a POI-state identifying model according to an embodiment of the present application.

FIG. 7 is a structural diagram of an apparatus for building a POI-state identifying model according to an embodiment of the present application, and as shown in FIG. 7, the apparatus may include an acquiring unit 01 and a training unit 02 which have the following main functions.

The acquiring unit 01 is responsible for acquiring training data which includes a text and label annotation results for a POI name and a POI state contained in the text.

Specifically, the acquiring unit 01 may acquire a seed text and the label annotation results of the POI name and the POI state corresponding to the POI name contained in the seed text; then replace the POI name in the seed text with a POI name in a POI database which has the same type as the POI name contained in the seed text, so as to obtain an extended text; and obtain the training data by the seed text and the extended text.

The seed text may be acquired by acquiring texts containing the POI name from the Internet using a pre-trained POI identifier; and filtering out texts which do not contain POI state change information from the texts containing the POI name utilizing a pre-constructed dictionary, so as to obtain the seed text; wherein the dictionary includes words for expressing the POI state change information.

The training unit 02 is configured to obtain input of a first label prediction submodel and a second label prediction submodel using a word sequence corresponding to the text, and train the first and second label prediction submodels with the label annotation result of the POI name contained in the text as an output target of the first label prediction submodel and the label annotation result of the POI state contained in the text as an output target of the second label prediction submodel, so as to obtain the POI-state identifying model including the first and second label prediction submodels.

Specifically, when obtaining the input of the first and second label prediction submodels using the word sequence corresponding to the text, the training unit 02 extracts semantic features of the word sequence corresponding to the text to obtain a hidden-layer vector sequence of the text; and takes the hidden-layer vector sequence as the input of the first and second label prediction submodels.

The semantic features of the word sequence corresponding to the text may be extracted with an ERNIE model, thereby improving the accuracy of extracting the semantic features of a long tail word.

As a preferred implementation, the above-mentioned training data further includes a label annotation result for an auxiliary POI name in the text, the auxiliary POI name being a POI name without a corresponding POI state description in the text.

Correspondingly, the training unit 02 is further configured to take the hidden-layer vector sequence of the text as input of a third label prediction submodel, and take the label annotation result of the auxiliary POI name of the text as an output target of the third label prediction submodel; and train the third label prediction submodel when training the first and second label prediction submodels.

All the first, second and third label prediction submodels may adopt a CRF mechanism and may be jointly trained with a joint loss function.

Fourth Embodiment

Figure 8:
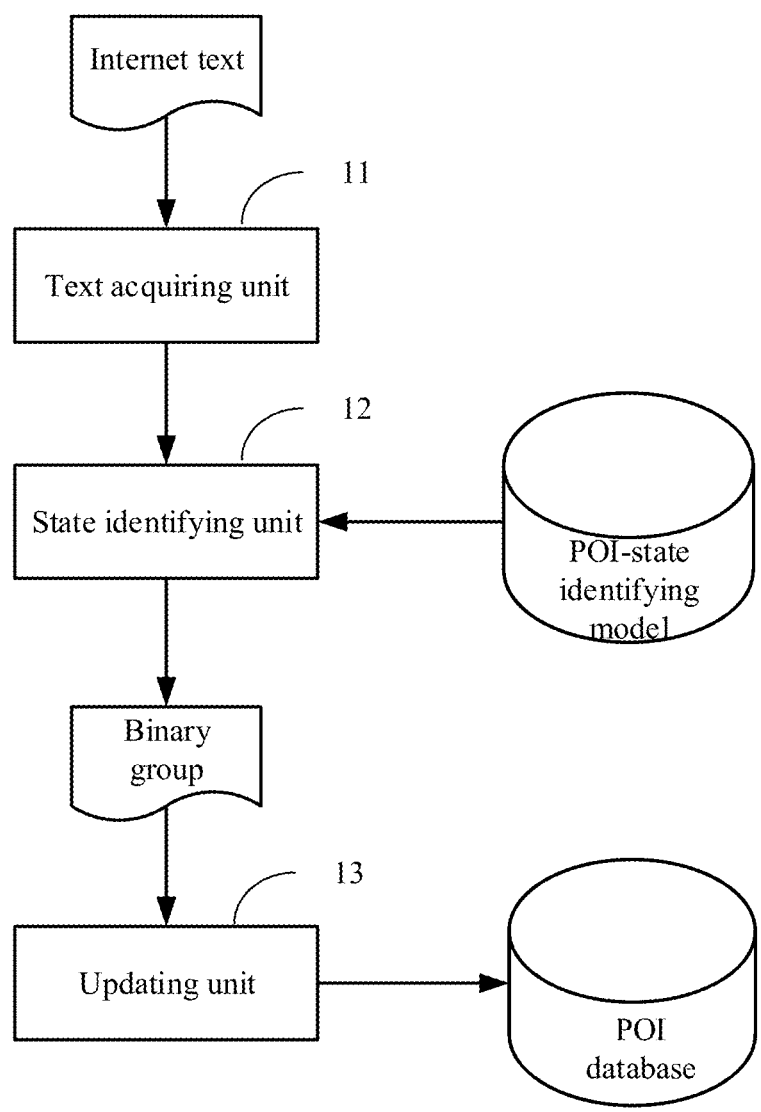
FIG. 8 is a structural diagram of an apparatus for acquiring POI state information according to a fourth embodiment of the present application.

FIG. 8 is a structural diagram of an apparatus for acquiring POI state information according to a fourth embodiment of the present application, and as shown in FIG. 8, the apparatus may include a text acquiring unit 11 and a state identifying unit 12, and may further include an updating unit 13. The main functions of each constitutional unit are as follows.

The text acquiring unit 11 is responsible for acquiring a text containing POI information in a preset time period from the Internet.

Specifically, the text acquiring unit 11 may acquire texts in the preset time period from the Internet; identify the POI information in the acquired texts by a pre-trained POI identifier; and retain the text containing the POI information.

The POI identifier may be pre-trained by an identifier training unit (not shown), and the identifier training unit extracts popular POI information from a POI database; search in the Internet using the extracted POI information; and train a label prediction model using the searched text and the corresponding POI information to obtain the POI identifier.

The state identifying unit 12 is configured to identify the text using a pre-trained POI-state identifying model to obtain a binary group in the text, the binary group including a POI name and the POI state information corresponding to the POI name; wherein the POI-state identifying model performs label prediction of the POI name and a POI state on a word sequence corresponding to the text, and label prediction results of the POI name and the POI state are aligned to obtain the binary group.

Specifically, the state identifying unit 12 may extract semantic features of the word sequence corresponding to the text using the POI-state identifying model to obtain a hidden-layer vector sequence; and perform the label prediction of the POI name and the POI state on the hidden-layer vector sequence.

When executing the alignment process, the state identifying unit 12 is specifically configured to determine a boundary of each predicted POI name label; and determine a corresponding POI state label in the boundary of the POI name label, and determining the POI state corresponding to the POI name using the POI state label occurring in the boundary most frequently based on a voting mechanism.

The updating unit 13 is configured to update the POI database using the obtained binary group.

After a series of binary groups are mined for the Internet text, the updating unit 13 may compare the mined binary groups with the POI names and the POI state information corresponding to the POI names recorded in the POI database, and if inconsistency exists, the updating unit 13 may update the POI names and the POI state information corresponding to the POI names recorded in the POI database with the mined binary groups.

In the updating process, the updating unit 13 may measure the accuracy of the binary group according to the occurrence frequency of the mined binary group, for example, consider the binary group with the occurrence frequency greater than a preset frequency threshold to be accurate, and update the POI database with the accurate binary group.

A specific application example is listed below:

texts containing POI information in the last month are acquired from the Internet, the number of the texts may be large, and several of them are given here:

Internet text 1: the Shanghai University Science Park and the Shanghai Wangyuan Enterprise Development Co., Ltd establish the Shanghai University Wangyuan Science Park in the Luosenbao Business Center in the Baoshan district;

Internet text 2: the Huoyan grand canyon is renamed as the Wulongshan grand canyon during scenic spot application;

Internet text 3: the Songming county real estate registration center is moved to No. 66, Xiusong street on Jun. 28, 2019, and business is suspended during the movement;

Internet text 4: in order to protect the natural ecological environment of the sources of the Yangtze, Yellow, and Lancang rivers, the Nianbaoyuze scenic spot is completely closed.

The acquired Internet texts containing the POI information are input into a POI-state identifying model respectively, and the POI-state identifying model identifies a binary group in each Internet text. The identification results are as follows:

the binary group corresponding to the Internet text 1: (Shanghai University Wangyuan Science Park, new);

the binary group corresponding to the Internet text 2: (Huoyan grand canyon, renamed);

the binary group corresponding to the Internet text 3: (Songming county real estate registration center, moved);

the binary group corresponding to the Internet text 4: (Nianbaoyuze scenic spot, closed).

The accuracy of a large number of acquired binary groups may be determined by means of the occurrence frequency, for example, the binary group having the identification frequency exceeding a preset threshold is considered to be accurate, and a POI database may be updated with the binary group. The accuracy of the acquired binary group may also be checked manually.

Through the above-mentioned process, the changed POI state information, such as "new", "renamed", "moved" and "closed", may be automatically and timely mined from an Internet document, and the POI database may be updated timely, such that a service provided by the POI database is based on accurate POI information, and the user experience is improved.

According to the embodiments of the present application, there are also provided an electronic device and a readable storage medium.

Figure 9:
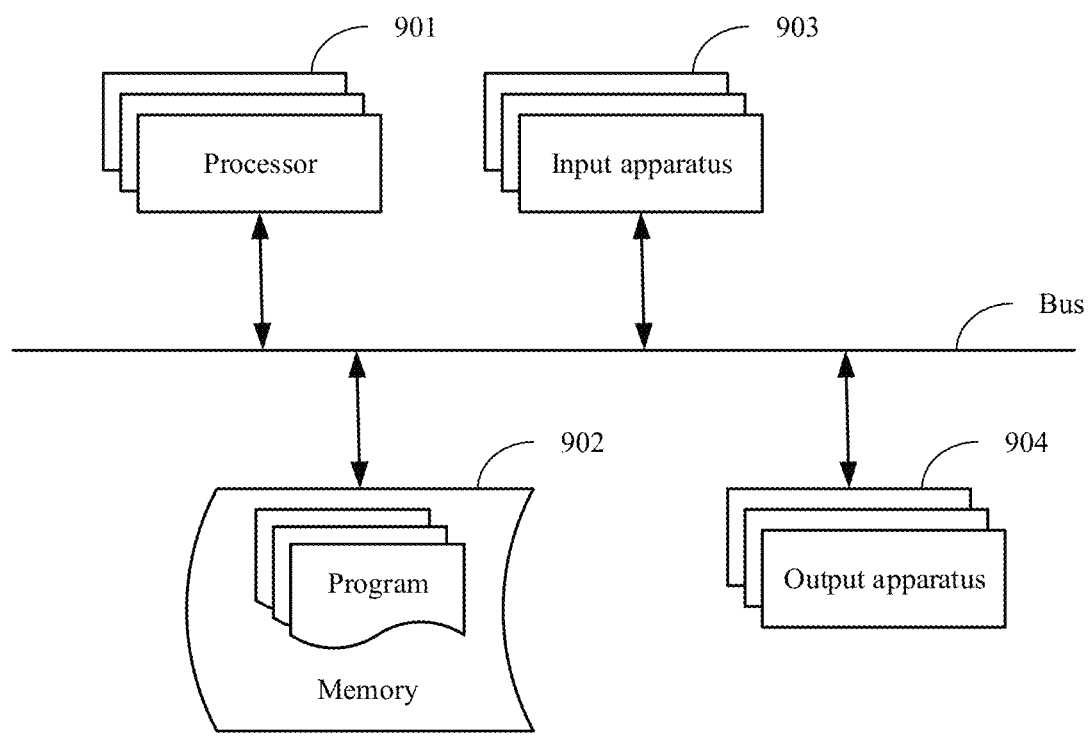
FIG. 9 is a block diagram of an electronic device configured to implement the embodiments of the present application.

FIG. 9 is a block diagram of an electronic device configured to implement the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 9, the electronic device includes one or more processors 901, a memory 902, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 9, one processor 901 is taken as an example.

The memory 902 is configured as the non-transitory computer readable storage medium according to the present application. The memory stores instructions executable by the at least one processor to cause the at least one processor to perform a method for building a POI-state identifying model or acquiring POI state information according to the present application. The non-transitory computer readable storage medium according to the present application stores computer instructions for causing a computer to perform the method for building a POI-state identifying model or acquiring POI state information according to the present application.

The memory 902 which is a non-transitory computer readable storage medium may be configured to store non-transitory software programs, non-transitory computer executable programs and modules, such as program instructions/modules corresponding to the method for building a POI-state identifying model or acquiring POI state information according to the embodiments of the present application. The processor 901 executes various functional applications and data processing of a server, that is, implements the method for building a POI-state identifying model or acquiring POI state information according to the above-mentioned embodiments, by running the non-transitory software programs, instructions, and modules stored in the memory 902.

The memory 902 may include a program storage area and a data storage area, wherein the program storage area may store an operating system and an application program required for at least one function; the data storage area may store data created according to use of the electronic device for building a POI-state identifying model or acquiring POI state information, or the like. Furthermore, the memory 902 may include a high-speed random access memory, or a non-transitory memory, such as at least one magnetic disk storage device, a flash memory device, or other non-transitory solid state storage devices. In some embodiments, optionally, the memory 902 may include memories remote from the processor 901, and such remote memories may be connected to the electronic device via a network. Examples of such a network include, but are not limited to, the Internet, intranets, local area networks, mobile communication networks, and combinations thereof.

The electronic device for the method for building a POI-state identifying model or acquiring POI state information may further include an input apparatus 903 and an output apparatus 904. The processor 901, the memory 902, the input apparatus 903 and the output apparatus 904 may be connected by a bus or other means, and FIG. 9 takes the connection by a bus as an example.

The input apparatus 903 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 904 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

From the above technical solution, the method and apparatus, the device as well as the computer storage medium according to the present application may have the following advantages.

1) In the present application, by mining the POI name and the POI state information corresponding to the POI name from the Internet text containing the POI information, a timely response of the Internet to a POI state change event is fully utilized, and compared with the way of artificially determining the POI information with the changed state, the human cost is saved, and the timeliness and the accuracy are improved.

2) According to the present application, both inclusion of the POI state change information in the Internet text and the specific POI state change, such as "new", "moved", "renamed" and "closed", of the corresponding POI name may be identified.

3) In the present application, the POI-state identifying model does not adopt the traditional subtask pipeline operation form that the POI name is identified from the text first, and then, the POI state information of the POI name is identified. Instead, the mode of parallel and associated processing of a plurality of subtasks is adopted; that is, the POI name and the POI state of the text are predicted in parallel, and then, the two prediction results are aligned to obtain the binary group.

4) In the present application, in the case where the text contains a plurality of POI names at the same time but only one POI name has the state change, the prediction submodel for the auxiliary POI name is merged into the POI-state identifying model and trained concurrently, thereby accurately identifying the POI name with the state change in the text, and eliminating the interference of the auxiliary POI name.

5) When the POI-state identifying model is trained, data extension is performed on the seed text using the POI database to obtain the training data, thereby increasing the number of the training texts to improve the accuracy of the POI-state identifying model.

6) In the POI-state identifying model, the semantic features of the word sequence corresponding to the input text are extracted using the ERNIE model, and the subword policy is used in the ERNIE model; that is, the POI name is separated into words with finer granularity with the BPE algorithm, thereby efficiently solving the problem of the long tail word.

7) The POI database is updated by the mined binary group, such that subsequent services provided based on the POI database are more accurate, thereby improving user experiences.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for building a POI-state identifying model, comprising:
acquiring training data which comprises a text and label annotation results for a POI name and a POI state contained in the text; and
obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model comprising the first and second label prediction submodels,
wherein the built POI-state identifying model is configured to identify an input text to obtain a binary group in the text, and the binary group comprises a POI name and POI state information corresponding to the POI name,
wherein the acquiring training data comprises:
acquiring a seed text and the label annotation results of the POI name and the POI state corresponding to the POI name contained in the seed text;
replacing the POI name in the seed text with a POI name in a POI database which has the same type as the POI name contained in the seed text, so as to obtain an extended text; and
obtaining the training data by the seed text and the extended text, wherein the acquiring the seed text comprises:
acquiring texts containing the POI name from the Internet using a pre-trained POI identifier; and
filtering out texts which do not contain POI state change information from the texts containing the POI name utilizing a pre-constructed dictionary, so as to obtain the seed text, wherein the dictionary comprises words for expressing the POI state change information.

2. The method according to claim 1, wherein the obtaining input of a first label prediction submodel and a second label prediction submodel using a word sequence corresponding to the text comprises:
extracting semantic features of the word sequence corresponding to the text to obtain a hidden-layer vector sequence of the text; and
taking the hidden-layer vector sequence as the input of the first and second label prediction submodels.

3. The method according to claim 2, wherein the extracting semantic features of the word sequence corresponding to the text comprises:
extracting the semantic features of the word sequence corresponding to the text using an enhanced representation from knowledge integration (ERNIE) model.

4. The method according to claim 2, wherein the training data further comprises a label annotation result for an auxiliary POI name in the text, the auxiliary POI name being a POI name without a corresponding POI state description in the text;
the method further comprises:
taking the hidden-layer vector sequence of the text as input of a third label prediction submodel, and taking the label annotation result of the auxiliary POI name of the text as an output target of the third label prediction submodel; and
training the third label prediction submodel when training the first and second label prediction submodels.

5. The method according to claim 1, wherein a conditional random field (CRF) mechanism is adopted for the first and second label prediction submodels.

6. A method for acquiring point-of-interest (POI) state information, comprising:
acquiring a text containing POI information in a preset time period from the Internet; and
identifying the text using a pre-trained POI-state identifying model built by a method for building a POI-state identifying model to obtain a binary group in the text, the binary group comprising a POI name and the POI state information corresponding to the POI name, the method for building the POI-state identifying model comprising:
acquiring training data which comprises a text and label annotation results for a POI name and a POI state contained in the text; and
obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model comprising the first and second label prediction submodels;
wherein the built POI-state identifying model is configured to identify an input text to obtain a binary group in the text, and the binary group comprises a POI name and POI state information corresponding to the POI name,
wherein the acquiring training data comprises:
acquiring a seed text and the label annotation results of the POI name and the POI state corresponding to the POI name contained in the seed text;
replacing the POI name in the seed text with a POI name in a POI database which has the same type as the POI name contained in the seed text, so as to obtain an extended text; and obtaining the training data by the seed text and the extended text;

wherein the POI-state identifying model performs label prediction of the POI name and a POI state on a word sequence corresponding to the text, and label prediction results of the POI name and the POI state are aligned to obtain the binary group.

7. The method according to claim 6, wherein the acquiring a text containing POI information in a preset time period from the Internet comprises:

acquiring texts in the preset time period from the Internet;
identifying the POI information in the acquired texts by a pre-trained POI identifier; and
retaining the text containing the POI information.

8. The method according to claim 7, wherein the POI identifier is trained by:

extracting popular POI information from a POI database;
searching in the Internet using the extracted POI information; and
training a label prediction model using the searched text and the corresponding POI information to obtain the POI identifier.

9. The method according to claim 6, wherein the operation that the POI-state identifying model performs label prediction of the POI name and a POI state on a word sequence corresponding to the text comprises:

extracting semantic features of the word sequence corresponding to the text using the POI-state identifying model to obtain a hidden-layer vector sequence; and
performing the label prediction of the POI name and the POI state on the hidden-layer vector sequence.

10. The method according to claim 6, wherein the operation that label prediction results of the POI name and the POI state are aligned to obtain the binary group comprises:

determining a boundary of each predicted POI name label; and
determining a corresponding POI state label in the boundary of the POI name label, and determining the POI state corresponding to the POI name using the POI state label occurring in the boundary most frequently based on a voting mechanism.

11. The method according to claim 10, further comprising:

updating the POI database using the obtained binary group.

12. The method according to claim 6, further comprising:
updating the POI database using the obtained binary group.

13. An electronic device, comprising:
at least one processor; and
a memory communicatively connected with the at least one processor;
wherein the memory stores instructions executable by the at least one processor, and the instructions are executed by the at least one processor to enable the at least one processor to perform a method for building a POI-state identifying model, wherein the method comprises:
acquiring training data which comprises a text and label annotation results for a POI name and a POI state contained in the text; and
obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model comprising the first and second label prediction submodels;

wherein the built POI-state identifying model is configured to identify an input text to obtain a binary group in the text, and the binary group comprises a POI name and POI state information corresponding to the POI name, wherein the acquiring training data comprises:
acquiring a seed text and the label annotation results of the POI name and the POI state corresponding to the POI name contained in the seed text;
replacing the POI name in the seed text with a POI name in a POI database which has the same type as the POI name contained in the seed text, so as to obtain an extended text; and
obtaining the training data by the seed text and the extended text, wherein the acquiring the seed text comprises:

acquiring texts containing the POI name from the Internet using a pre-trained POI identifier; and filtering out texts which do not contain POI state change information from the texts containing the POI name utilizing a pre-constructed dictionary, so as to obtain the seed text, wherein the dictionary comprises words for expressing the POI state change information.

14. An electronic device, comprising:
at least one processor; and
a memory communicatively connected with the at least one processor;
wherein the memory stores instructions executable by the at least one processor, and the instructions are executed by the at least one processor to enable the at least one processor to perform a method for acquiring point-of-interest (POI) state information, wherein the method for acquiring point-of-interest (POI) state information comprises:
acquiring a text containing POI information in a preset time period from the Internet; and
identifying the text using a pre-trained POI-state identifying model built by a method for building a POI-state identifying model to obtain a binary group in the text, the binary group comprising a POI name and the POI state information corresponding to the POI name, the method for building the POI-state identifying model comprising:
acquiring training data which comprises a text and label annotation results for a POI name and a POI state contained in the text; and
obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model comprising the first and second label prediction submodels;

wherein the built POI-state identifying model is configured to identify an input text to obtain a binary group in the text, and the binary group comprises a POI name and POI state information corresponding to the POI name, wherein the acquiring training data comprises:

acquiring a seed text and the label annotation results of the POI name and the POI state corresponding to the POI name contained in the seed text;

replacing the POI name in the seed text with a POI name in a POI database which has the same type as the POI name contained in the seed text, so as to obtain an extended text; and obtaining the training data by the seed text and the extended text;

wherein the POI-state identifying model performs label prediction of the POI name and a POI state on a word sequence corresponding to the text, and label prediction results of the POI name and the POI state are aligned to obtain the binary group.

15. A non-transitory computer-readable storage medium storing computer instructions therein, wherein the computer instructions are used to cause a computer to perform a method for building a POI-state identifying model, wherein the method comprises:

acquiring training data which comprises a text and label annotation results for a POI name and a POI state contained in the text; and obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model comprising the first and second label prediction submodels;

wherein the built POI-state identifying model is configured to identify an input text to obtain a binary group in the text, and the binary group comprises a POI name and POI state information corresponding to the POI name, wherein the acquiring training data comprises:

acquiring a seed text and the label annotation results of the POI name and the POI state corresponding to the POI name contained in the seed text;

replacing the POI name in the seed text with a POI name in a POI database which has the same type as the POI name contained in the seed text, so as to obtain an extended text; and obtaining the training data by the seed text and the extended text, wherein the acquiring the seed text comprises:

acquiring texts containing the POI name from the Internet using a pre-trained POI identifier; and filtering out texts which do not contain POI state change information from the texts containing the POI name utilizing a pre-constructed dictionary, so as to obtain the seed text, wherein the dictionary comprises words for expressing the POI state change information.

16. A non-transitory computer-readable storage medium storing computer instructions therein, wherein the computer instructions are used to cause a computer to perform a method for acquiring point-of-interest (POI) state information, wherein the method for acquiring point-of-interest (POI) state information comprises:

acquiring a text containing POI information in a preset time period from the Internet; and identifying the text using a pre-trained POI-state identifying model built by a method for building a POI-state identifying model to obtain a binary group in the text, the binary group comprising a POI name and the POI state information corresponding to the POI name, the method for building the POI-state identifying model comprising:

acquiring training data which comprises a text and label annotation results for a POI name and a POI state contained in the text; and obtaining input of a first label prediction submodel and a second label prediction submodel using a word sequence corresponding to the text, and training the first and second label prediction submodels with the label annotation result of the POI name contained in the text as an output target of the first label prediction submodel and the label annotation result of the POI state contained in the text as an output target of the second label prediction submodel, so as to obtain the POI-state identifying model comprising the first and second label prediction submodels;

wherein the built POI-state identifying model is configured to identify an input text to obtain a binary group in the text, and the binary group comprises a POI name and POI state information corresponding to the POI name, wherein the acquiring training data comprises:

acquiring a seed text and the label annotation results of the POI name and the POI state corresponding to the POI name contained in the seed text;

replacing the POI name in the seed text with a POI name in a POI database which has the same type as the POI name contained in the seed text, so as to obtain an extended text; and obtaining the training data by the seed text and the extended text;

wherein the POI-state identifying model performs label prediction of the POI name and a POI state on a word sequence corresponding to the text, and label prediction results of the POI name and the POI state are aligned to obtain the binary group.

* * * * *